United States Patent
Ivanov et al.

(10) Patent No.: US 7,583,133 B2
(45) Date of Patent: Sep. 1, 2009

(54) SELF-OSCILLATING REGULATED LOW-RIPPLE CHARGE PUMP AND METHOD

(75) Inventors: Vadim V. Ivanov, Tucson, AZ (US); Tadija Janjic, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 35 days.

(21) Appl. No.: 12/011,244

(22) Filed: Jan. 25, 2008

(65) Prior Publication Data
US 2009/0189681 A1    Jul. 30, 2009

(51) Int. Cl.
*G06F 1/10* (2006.01)
(52) U.S. Cl. .......................... 327/536; 363/59; 363/60
(58) Field of Classification Search ................. 327/536; 363/59, 60
See application file for complete search history.

(56) References Cited

U.S. PATENT DOCUMENTS

| | | | |
|---|---|---|---|
| 5,097,226 A * | 3/1992 | Pascucci et al. | 331/46 |
| 5,574,634 A * | 11/1996 | Parlour et al. | 363/59 |
| 6,483,376 B1 * | 11/2002 | Bienvenu et al. | 327/536 |
| 6,717,458 B1 * | 4/2004 | Potanin | 327/536 |
| 7,173,477 B1 * | 2/2007 | Raghavan | 327/536 |
| 7,304,529 B2 * | 12/2007 | Armaroli et al. | 327/536 |
| 7,342,436 B2 * | 3/2008 | Tsuchiya et al. | 327/536 |

* cited by examiner

*Primary Examiner*—Kenneth B. Wells
(74) *Attorney, Agent, or Firm*—John J. Patti; Wade J. Brady, III; Frederick J. Telecky, Jr.

(57) ABSTRACT

Charge pump circuitry (30) compares bottom plate voltages of first (C1) and second (C2) flying capacitors in a current mode charge pump (1B) to a reference value ($V_{DD}-V_{28}$) by means of a comparator (20) which drives a flip-flop (22) that generates first (F1) and second (F2) complementary phase signals. The first and second phase signals control switching of the flying capacitors to determine a flying capacitor swapping frequency just low enough to prevent saturation of a discharge current source (10) that discharges the flying capacitors into an output conductor (3).

20 Claims, 3 Drawing Sheets

SELF-OSCILLATING REGULATED LOW-RIPPLE CHARGE PUMP AND METHOD

BACKGROUND OF THE INVENTION

The present invention relates generally to integrated charge pump circuits, and more particularly to improvements therein which reduce power consumption and which reduce the amount of integrated circuit chip area required.

Use of an on-chip charge pump in an integrated circuit operational amplifier to bootstrap an input stage tail current source thereof provides an increased rail-to-rail common mode input voltage range of the operational amplifier. The boosted output voltage produced by the charge pump needs to have a low ripple voltage because the ripple voltage causes noise in the tail current which then propagates to the output of the operational amplifier. It is desirable that the on-chip charge pump consume as little current and power as possible.

FIG. 1 shows a low-ripple, on-chip current mode charge pump that has been used in the assignee's OPA365 operational amplifier, which is believed to be the closest prior art. In FIG. 1, an integrated circuit 1A includes a current mode charge pump circuit 1B which produces a boosted output voltage Vout. Vout is applied to bias a current source that functions as the tail current source of the input stage of an operational amplifier (not shown). Current mode charge pump 1B includes an operational amplifier 4 that functions as a feedback amplifier. The (+) input of feedback amplifier 4 is connected by a conductor 6 to the (+) terminal of a voltage source 5, the (−) terminal of which is connected to the positive rail voltage source $V_{DD}$, whereby a reference voltage Vref is produced on conductor 6. Voltage source 5 may produce a constant voltage of about 1 volt, and can be implemented in various ways, for example by means of the gate-to-source voltage $V_{GS}$ of a P-channel MOS transistor and a circuit including a resistor and a current source (not shown). (Since the voltage source 5 must operate at voltages higher than $V_{DD}$, the source of the P-channel transistor would be coupled through the resistor and the current source to Vout, with the gate and drain of the P-channel transistor being connected to $V_{DD}$.) The (−) input of feedback amplifier 4 is connected to conductor 3, on which the charge pump output voltage Vout is produced. The output of feedback amplifier 4 is connected by conductor 8 to the control terminals of two essentially identical controlled current sources 7 and 9 which produce a "discharge current" I0 and a "recharge current" I1, respectively. The upper terminal of each of controlled current sources 7 and 9 is connected to $V_{DD}$.

The lower terminal of discharge current source 7 is connected by conductor 12 to one terminal of each of switches S1 and S5. The other terminal of switch S1 is connected by conductor 13 to the "bottom" plate of a flying capacitor C1 and to one terminal of a switch S2, the other terminal of which is connected to a conductor 2, on which a supply voltage such as $V_{SS}$ is applied. The "upper" plate of flying capacitor C1 is connected by conductor 14 to one terminal of each of switches S3 and S4. The other terminal of switch S3 is connected by conductor 15 to the lower terminal of recharge current source 9. The other terminal of switch S4 is connected to charge pump output conductor 3. The lower terminal of recharge current source 9 is connected by conductor 15 to one terminal of switch S7. The other terminal of switch S7 is connected by conductor 18 to the top plate of a second flying capacitor C2 and to one terminal of a switch S8, the other terminal of which is connected to Vout conductor 3. The bottom plate of flying capacitor C2 is connected by conductor 17 to one terminal of each of switches S5 and S6. The other terminal of switch S6 is connected to $V_{SS}$ conductor 2. The other terminal of switch S5 is connected to conductor 12. A voltage $V_{DISCHARGE}$ on conductor 12 is equal to either the bottom plate voltage Vc1 of flying capacitor C1 or the bottom plate voltage Vc2 of flying capacitor C2.

An internal bypass capacitor C0 is connected between Vout conductor 3 and $V_{DD}$. A load 19 which draws a load current $I_L$ is connected between Vout conductor 3 and $V_{SS}$, and can be either internal or external to integrated circuit chip 1A. Typically, an external oscillator 10A generates a phase signal F1 and its logical complement F2. Phase signal F1 controls switches S1, S4, S6, and S7 and phase signal F2 controls switches S2, S3, S5, and S8.

Flying capacitors C1 and C2 are alternately recharged and alternately discharged into Vout conductor 3 so as to produce an essentially constant value of output voltage Vout. In the example of FIG. 1, Vout is used to control the tail current of an operational amplifier (not shown) wherein the gate-to-source voltage $V_{GS}$ of a MOS transistor (not shown) which functions as a tail current source needs to be equal to a reference voltage Vref that is roughly 1 volt above the positive rail voltage $V_{DD}$ and is generated by means of voltage source 5. The various switches of charge pump 1B typically are implemented by means of MOS transistors and are controlled such that one of the flying capacitors C1 and C2 is always connected by a switch to the output Vout except during short switching transitions. The value of the discharge current I0 and the recharge current I1 is determined by the feedback loop including amplifier 4, with Vout as its inverting input and the voltage Vref on conductor 6 as its non-inverting input.

If various components, including controlled current sources I0, I1 and operational amplifier 14 are ideal, then the discharging current I0 and the recharging current I1 are equal to the load current $I_L$, and Vout is essentially constant (except for a relatively small ripple voltage component) during the flying capacitor discharge process. This is because the feedback loop including feedback amplifier 4 and controlled current sources 7 and 9 adjusts I0 and I1 so as to cause Vout to be precisely equal to Vref as a result of each of flying capacitors C1 and C2 being alternately connected to charge pump output conductor 3 and being discharged to load 19 by discharge current I0 from controlled current source 7, while the other flying capacitor is being recharged by the same amount of current I1 from controlled current source 9.

Typically, external oscillator 10A is used to cause the "swapping" of flying capacitors C1 and C2 to occur at a frequency just above the bandwidth of the above mentioned operational amplifier (not shown) that includes input tail current source 26. The "swapping" of flying capacitors C1 and C2 refers to alternately switching their functions from being recharged by I1 to being discharged by I0.

However, the foregoing technique is not optimal from a power efficiency standpoint because the flying capacitor swapping frequency needs to be based on worst-case values of flying capacitors C1 and C2, $V_{DD}$, and load current $I_L$. During the switching transitions between phases F1 and F2, charge pump 1 consumes energy being used to recharge the switch gate capacitances of MOS transistors (not shown) which are typically used to implement switches S1, S2, ... S8 and to recharge parasitic capacitances Cp1 and Cp2 associated with flying capacitors C1 and C2.

Consequently, the power consumption of charge pump circuitry 1B is directly proportional to the frequency of phase signals F1 and F2 and is inversely proportional to the capacitance of flying capacitors C1 and C2.

In existing products including prior art charge pump 1B of FIG. 1, switching between pulses of phase signals F1 and F2 is typically controlled by external oscillator 10A. The frequency of external oscillator 10A typically has to be chosen for the worst-case combination of power supply values, charge pump load current value, and high resistances and capacitances of on-chip frequency-setting resistors and capacitors which typically have at least a 15% variation in value due to process parameter variation.

The bottom plate voltage Vc1 or Vc2 of the flying capacitor presently being discharged by discharge current I0 increases as the parasitic capacitance Cp1 or Cp2 associated with that flying capacitor is charged up, but the bottom plate voltage Vc1 or Vc2 cannot exceed $V_{DD}$. The worst case capacitance value of flying capacitors C1 and C2 is selected in accordance with the worst case values of load current $I_L$, the charge pump supply voltage, and Vout.

As a practical matter, the flying capacitor values must be at least twice the values required for charge pump operation with nominal values of the various circuit parameters. Every time the flying capacitor functions are effectively swapped, some energy is lost or wasted because it is necessary to recharge one of the parasitic capacitors Cp1 or Cp2. The current necessary to recharge parasitic capacitors Cp1 or Cp2 is in effect lost. Therefore, it is desirable that the capacitor swapping frequency be as small as possible, and it also is desirable to reduce integrated circuit chip area and cost by making the flying capacitors as small as possible, and it also is desirable to decrease the parasitic components Cp1 and Cp2 of the flying capacitors by making their capacitances as small as possible.

Thus, there is an unmet need for an improved integrated circuit charge pump circuit which operates more efficiently than the closest prior art charge pump circuits having comparable low noise performance.

There also is an unmet need for an improved integrated circuit charge pump circuit which requires less integrated circuit chip area than the closest prior art charge pump circuits having comparable low noise performance.

SUMMARY OF THE INVENTION

It is an object of the invention to provide an improved integrated circuit charge pump circuit which operates more efficiently than the closest prior art charge pump circuits having comparable low noise performance.

It is another object of the invention to provide an improved integrated circuit charge pump circuit which requires less integrated circuit chip area than the closest prior art charge pump circuits having comparable low noise performance.

Briefly described, and in accordance with one embodiment, the present invention provides charge pump circuitry (30) that compares bottom plate voltages of first (C1) and second (C2) flying capacitors in a current mode charge pump (1B) to a reference value ($V_{DD}$-$V_{28}$) by means of a comparator (20) which drives a flip-flop (22) that generates first (F1) and second (F2) complementary phase signals. The first and second phase signals control switching of the flying capacitors to determine a flying capacitor swapping frequency just low enough to prevent saturation of a discharge current source (I0) that discharges the flying capacitors into an output conductor (3).

In one embodiment, the invention provides charge pump circuitry (30) including a current mode charge pump circuit (1B) having first (C1) and second flying (C2) capacitors and various associated switches operative in response to first (F1) and second (F2) phase signals which are of opposite phase, first (7) and second (9) controlled current sources, and a feedback amplifier (4) all coupled so as to generate a boosted output voltage (Vout). Self-oscillating circuitry (10B) includes a comparison circuit (20) having first and second inputs and an output ($V_{21}$), a flip-flop circuit (22) having a clock input (21) coupled to the output ($V_{21}$) of the comparison circuit (20) and first and second outputs producing the first (F1) and second (F2) phase signals, respectively. The current mode charge pump circuit (1B) produces a discharge signal ($V_{DISCHARGE}$) representative of first (Vc1) and second (Vc2) bottom plate voltages alternately produced on the first (C1) and second (C2) flying capacitors. The comparison circuit output ($V_{21}$) indicates times at which the first (Vc1) and second (Vc2) bottom plate voltages approach to within a predetermined voltage ($V_{28}$) of a first supply voltage ($V_{DD}$) of the charge pump circuitry (30). The first input (+) of the comparison circuit (20) receives the discharge signal ($V_{DISCHARGE}$).

In a described embodiment, the comparison circuit includes a comparator (20) and a voltage source (28) coupled between the second (−) input of the comparison circuit (20) and the first supply voltage ($V_{DD}$). The flip-flop circuit (22) is configured to perform a divide-by-two function.

In the described embodiment, the voltage source (28) generates a voltage of sufficient magnitude to prevent saturation of the first controlled current source (7). The self-oscillating circuitry (10B) is powered by the first supply voltage ($V_{DD}$) and a LDO (low drop out) regulator (11).

In one embodiment, the invention provides a method for operating charge pump circuitry (30) to generate a boosted output signal (Vout), including comparing a discharge signal ($V_{DISCHARGE}$) produced in a current mode charge pump (1B) to a reference value ($V_{DD}$-$V_{28}$) by means of a comparison circuit (20) producing an output signal ($V_{21}$) having edges indicative, respectively, of times at which the discharge signal ($V_{DISCHARGE}$) rises above the reference value ($V_{DD}$-$V_{28}$) and times at which the discharge signal ($V_{DISCHARGE}$) falls below the reference value ($V_{DD}$-$V_{28}$), the discharge signal ($V_{DISCHARGE}$) being representative of first (Vc1) and second (Vc2) bottom plate voltages alternately produced on first (C1) and second (C2) flying capacitors of the current mode charge pump (1B); applying the output signal ($V_{21}$) of the comparison circuit (20) to an input of a flip-flop (22); generating first (F1) and second (F2) complementary phase signals by means of the flip-flop (22); and applying the first (F1) and second (F2) phase signals to control electrodes of various switches that control operation of the first (C1) and second (C2) flying capacitors to generate the discharge signal ($V_{DISCHARGE}$). The reference value ($V_{DD}$-$V_{28}$) approximately minimizes the frequency of the first (F1) phase signal and also avoid saturation of a controlled current source (I0) of the current mode charge pump (1B).

In one embodiment, the invention provides current mode charge pump circuitry (30), including means (20) for comparing a discharge signal ($V_{DISCHARGE}$) produced in a current mode charge pump (1B) to a reference value ($V_{DD}$-$V_{28}$) by means of a comparison circuit (20) producing an output signal ($V_{21}$) indicative of times at which the discharge signal ($V_{DISCHARGE}$) rises above the reference value ($V_{DD}$-$V_{28}$) and times at which the discharge signal ($V_{DISCHARGE}$) falls below the reference value ($V_{DD}$-$V_{28}$), the discharge signal ($V_{DISCHARGE}$) being representative of first (Vc1) and second (Vc2) bottom plate voltages alternately produced on first (C1) and second (C2) flying capacitors of the current mode charge pump (1B); means (22) for generating first (F1) and second (F2) complementary phase signals in response to the output signal ($V_2$) of the comparison circuit (20); and means for applying the first (F1) and second (F2) phase signals to control electrodes of various switches (S1, 2 ... 8) which control circuit connections of the first (C1) and second (C2) flying capacitors to generate the discharge signal ($V_{DISCHARGE}$) to thereby determine a flying capacitor swapping frequency of the current mode charge pump (1B).

DETAILED DESCRIPTION OF THE PREFERRED EMBODIMENTS

The present invention provides an energy-efficient way of creating an accurate on-chip, low-noise voltage source by providing differential current-mode charge pump circuitry wherein swapping of the flying capacitors is based on the bottom plate voltage (i.e., $V_{DISCHARGE}$ in Prior Art FIG. 1) of the flying capacitor presently being discharged. The resulting "self-oscillation" ensures the lowest possible flying capacitor swapping frequency for any particular load on the charge pump circuit and any particular supply voltage.

Figure 1:
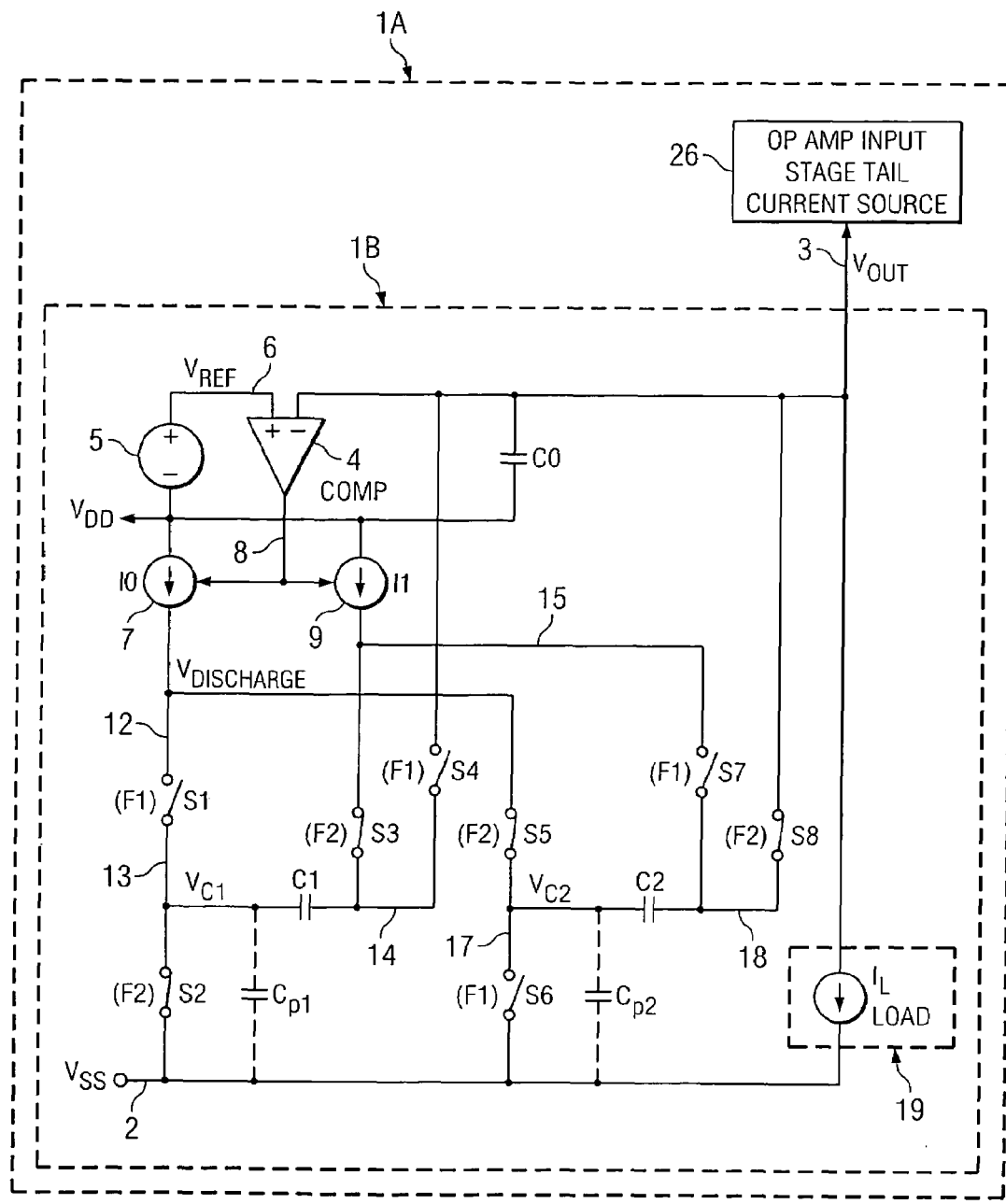
FIG. 1 is a schematic diagram of a prior art charge pump circuit.
Figure 1:
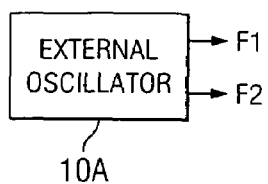
Figure 2:
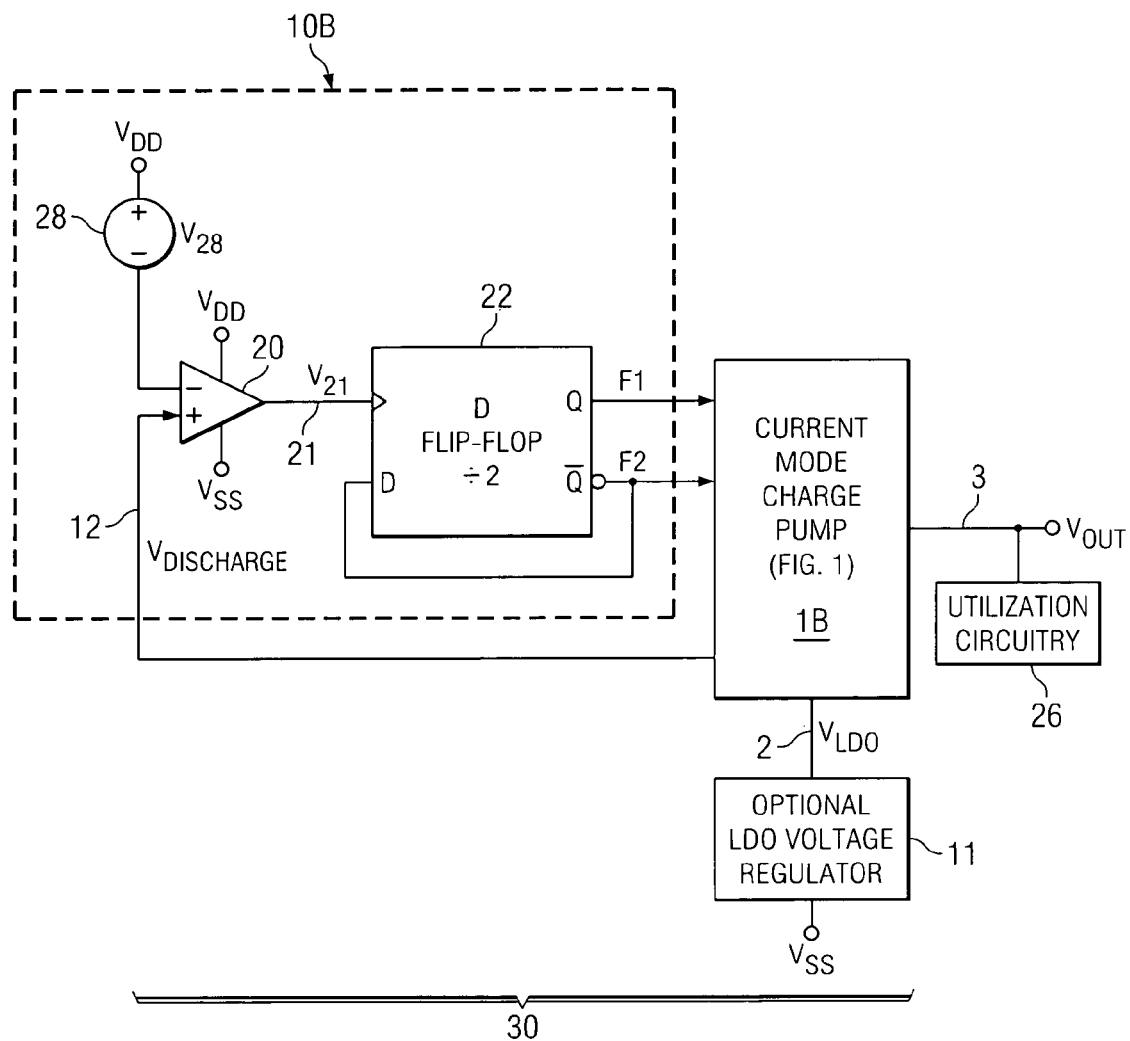
FIG. 2 is a schematic diagram of a self-oscillating charge pump circuit according to the present invention.

FIG. 2 shows an integrated circuit including a self-oscillating charge pump 30, the output voltage Vout of which can be applied via conductor 3 to an on-chip utilization circuit 26, such as the previously mentioned tail current source of an operational amplifier. Self-oscillating charge pump 30 includes the current mode charge pump 1B of Prior Art FIG. 1 along with a phase signal generating circuit 10B which includes a comparison circuit. The comparison circuit may be a comparator including built-in offset circuitry. Alternatively, the comparison circuit may include a comparator 20 coupled between $V_{DD}$ and $V_{SS}$ with its (−) input coupled to the (−) terminal of a voltage source 28 having its (+) terminal connected to $V_{DD}$.

A power supply voltage $V_{SS}$ may be applied to conductor 2 of current mode charge pump 1B of FIG. 1, or alternatively, a regulated reference voltage $V_{LDO}$ may be applied to conductor 2. $V_{LDO}$ may be generated by a conventional LDO (low drop out) voltage regulator 11 connected between $V_{DD}$ and $V_{SS}$. LDO voltage regulator 11 may be external to integrated circuit chip 1A or it may be included in the same integrated circuit chip with self-oscillating charge pump 30. Use of LDO voltage regulator 11 decreases the amount of clock signal leakage noise that propagates to the output Vout. (Every time switching of the flying capacitors occurs in charge pump 1B, a large pulse of current flows through the source of the power supply voltage $V_{DD}$ and causes a power supply ripple voltage due to parasitic resistances and integrated circuit wire bond inductance. That power supply ripple voltage propagates through the charge pump circuitry and causes an undesirable noise component on the charge pump output signal Vout.)

The (+) input of comparator 20 is connected to receive the discharge voltage $V_{DISCHARGE}$ produced on conductor 12 (FIG. 1) by current mode charge pump 1B. Comparator 20 produces an output signal $V_{21}$ on conductor 21, wherein $V_2$ is a "0" if $V_{DISCHARGE}$ is less than $V_{DD}$ minus the voltage $V_{28}$ of voltage source 28 and is a "1" if $V_{DISCHARGE}$ is greater than $V_{DD}$ minus the voltage $V_{28}$ of voltage source 28. $V_{21}$ is applied to the clock input of a D-type flip-flop 22. The Q output of flip-flop 22 produces the phase signal F1, which is applied to the control electrodes of various switches of current mode charge pump 1B as shown in FIG. 1. The $\overline{Q}$ output of flip-flop 22 produces the phase signal F2, which is connected to various switches of current mode charge pump 1B as shown in FIG. 1, and also is connected to the D input of flip-flop 22, thereby causing it to function as a positive-edge-triggered divide-by-two circuit.

The power consumption of charge pump 30 of FIG. 2 is reduced by forcing it to self-oscillate at the lowest possible operational frequency for any particular circuit parameters, such as $V_{DD}$, load current $I_L$, and the bandwidth of the above mentioned operational amplifier that includes the above mentioned tail current source. The instants at which each swapping of the flying capacitor discharge and recharge functions occurs are defined by the voltage Vc1 or Vc2 at the bottom plate of the flying capacitor presently coupled by switch S4 or S8 to Vout conductor 3. That is, the instant at which each swapping occurs is defined by the voltage $V_{DISCHARGE}$ on conductor 12, which is coupled by either switch S1 or S5 to the bottom plate of the flying capacitor presently coupled to Vout.

$V_{28}$ has a value at which current source 10 becomes close to saturation and cannot deliver current any longer. Therefore, as $V_{DISCHARGE}$ approaches $V_{DD}-V_{28}$, current source 10 tends to saturate and therefore no longer is capable of accurately delivering the load current and accurately maintaining Vout equal to Vref. Accordingly, the present invention provides a way of swapping the functions of flying capacitors C1 and C2 at a minimum swapping frequency in a way that preserves the accuracy of self-oscillating charge pump 30.

Specifically, in self-oscillating charge pump 30 the functions of flying capacitors C1 and C2 are swapped only when their respective bottom plate voltages Vc1 and Vc2 are increased to $V_{28}$, for example to 150 millivolts below positive rail voltage $V_{DD}$, because controlled current source 7 can not accurately provide discharge current I0 when $V_{DISCHARGE}$ is closer than approximately 150 millivolts to $V_{DD}$. The bottom plates of flying capacitors C1 and C2 are switched to produce discharge voltage $V_{DISCHARGE}$ on conductor 12 when either switch S1 or S5 is closed so as to cause the discharge and recharge functions of flying capacitors C1 and C2 to be swapped before discharge current source 7 begins to saturate. Comparator 20 compares discharge voltage $V_{DISCHARGE}$ of the bottom plate of the flying capacitor C1 or C2 presently being discharged by 10 such that $V_{21}$ goes from a "0" level to a "1" level when $V_{DISCHARGE}$ exceeds $V_{DD}-150$ millivolts. That causes flip-flop 22 to change state and thereby reverse the complementary logic levels of phase signals F1 and F2. That in turn switches the connections of flying capacitors C1 and C2 so as to swap their functions of being discharged and recharged.

For example, when flying capacitor C2 is almost completely discharged at the end of the present F2 pulse, then its top plate 18 is disconnected from Vout conductor 3 and is connected by switch S7 so as to receive recharge current I1 via conductor 15 from recharge current source 9. At the same time, bottom plate 17 of capacitor C2 is connected by switch S6 to $V_{LDO}$. Essentially simultaneously with that, the top plate 14 of flying capacitor C1 is connected by switch S4 to Vout and its bottom plate 13 is connected by switch S1 so as to receive discharge current I0 via conductor 12 from discharge current source 7. Then discharge current I0 begins to charge parasitic capacitor Cp1 and thereby discharge capacitor C1 into Vout conductor 3 until capacitor C1 is nearly completely discharged and $V_{DISCHARGE}$ has increased to $V_{DD}-150$ millivolts, as indicated by the Vc1 section of the $V_{DISCHARGE}$ waveform of FIG. 3. That in turn causes the output $V_{21}$ of comparator 20 to go from a "0" level to a "1"

level. That causes flip-flop 22 to reverse the logic levels of phase signals F1 and F2 and thereby reverse the discharge and recharge functions of flying capacitors C1 and C2.

Thus, discharge current I0 is always simultaneously discharging one of the two flying capacitors and recharge current I1 is always recharging the other flying capacitor except during the short switching transitions of pulses of complementary phase signals F1 and F2, and feedback amplifier 4 continuously determines and controls the value of the equal currents I0 and I1 needed in order to maintain Vout equal to Vref.

Thus, at every instant at which $V_{DISCHARGE}$ becomes equal to $V_{DD}$–150 millivolts, output $V_{21}$ of comparator 20 goes from a "0" to a "1" level, thereby forcing flip-flop 22 to change its state. This causes the bottom plate of the previously recharged flying capacitor to be connected between Vout and causes discharge current source 10 to discharge that flying capacitor into Vout on conductor 3, and also causes the bottom plate of the other flying capacitor to be connected between recharge current source I1 and $V_{LDO}$ to recharge the latter capacitor.

Figure 3:
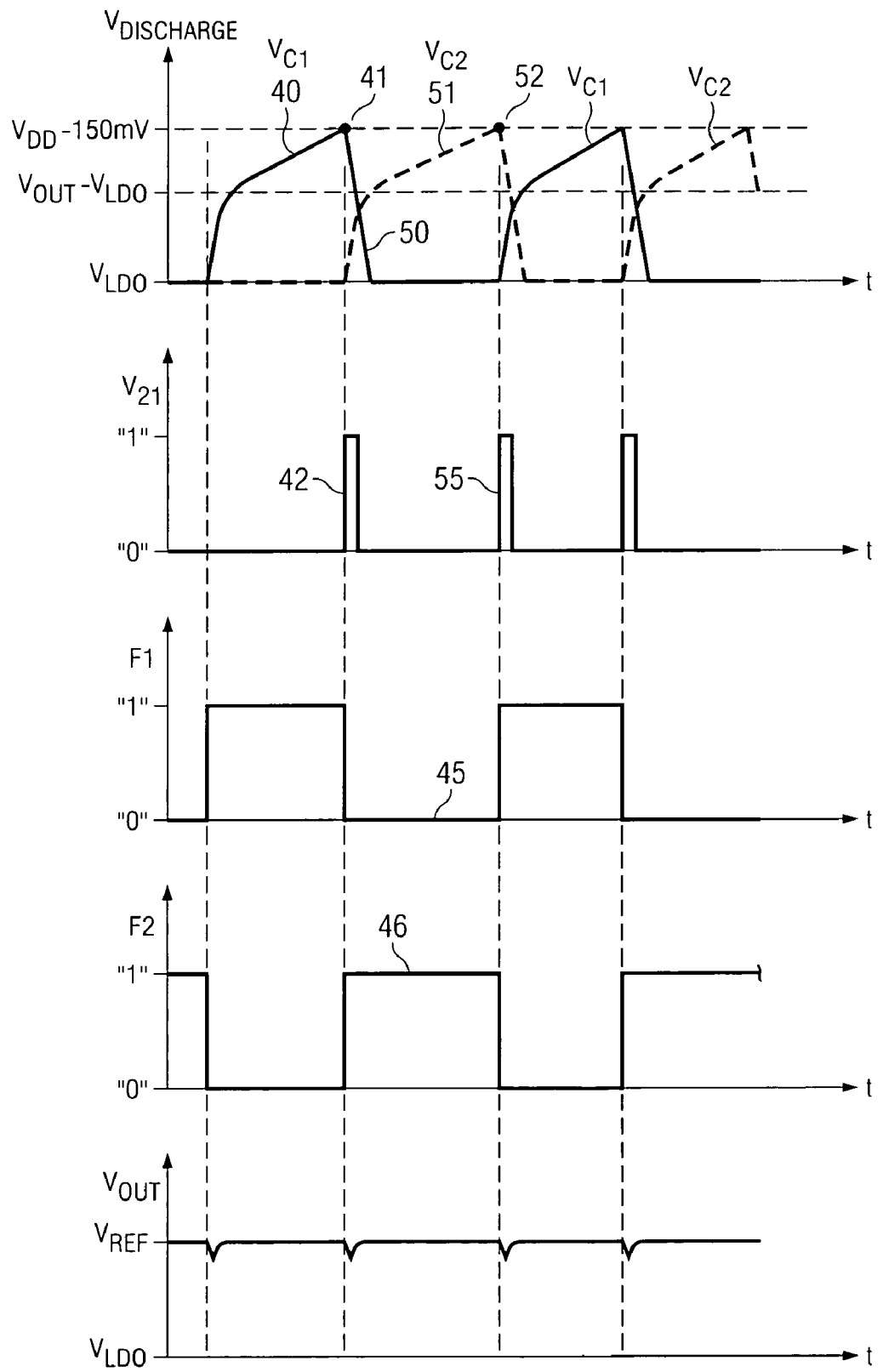
FIG. 3 is a timing diagram that indicates details of the operation of the optimally self-oscillating charge pump circuit of FIG. 2.

For example, assume flying capacitor C1 is being discharged by I0 flowing through switch S1 into parasitic capacitance Cp1 and into bottom plate 13 of capacitor C1, boosting Vc1 toward $V_{DD}$ by forcing charge stored in capacitor C1 through switch S4 into Vout conductor 3, and therefore also boosting $V_{DISCHARGE}$ toward $V_{DD}$ as indicated by reference 40 in FIG. 3 because switch S1 is closed. Then bottom plate 17 of flying capacitor C2 is connected to $V_{LDO}$ through switch S6 and I1 simultaneously is recharging C2 through switch S7. When $V_{DISCHARGE}$ reaches $V_{DD}$–150 millivolts as indicated by point 41 in FIG. 3, the output $V_{21}$ of comparator 20 rapidly goes from a "0" to a "1" level as indicated by rising pulse edge 42 in FIG. 3, causing flip-flop 22 to change state and reverse the logic levels of phase signals F1 and F2 as indicated at points 45 and 46 in FIG. 3. These new levels of phase signals F1 and F2 open switches S1, S4, S6, and S7 and close switches S2, S3, S5, and S8, thereby connecting bottom plate 13 of flying capacitor C1 to $V_{LDO}$ through switch S2 and connecting top plate 14 of capacitor C1 to I1 through switch S3, and thereby causing C1 to be recharged. Bottom plate 17 of C2 is connected to I0 through switch S5 and top plate 18 is connected to Vout conductor 3 through switch S8. That it is, the discharge function and recharge functions of flying capacitors C1 and C2 have been swapped.

Consequently, $V_{DISCHARGE}$ falls rapidly toward $V_{LDO}$, as indicated by reference numeral 50 in FIG. 3. At the same time, flying capacitor C2 is discharged by I0 into Vout as parasitic capacitance Cp2 is charged and C1 is recharged by I1. This causes Vc2 to rise toward $V_{DD}$, which causes $V_{DISCHARGE}$ to also rise toward $V_{DD}$ as indicated by reference numeral 51 in FIG. 3 until $V_{DISCHARGE}$ reaches $V_{DD}$–150 millivolts as indicated by point 52. This causes $V_2$, to again go from a "0" to a "1" level as indicated by reference numeral 55, causing flip-flop 22 to change state again and thereby again reverse the logic levels of phase signals F1 and F2, thereby again swapping the discharge and recharge functions of C1 and C2.

The same process continues to be repeated as long as self-oscillating charge pump 30 continues to be powered up. The timing of the low amplitude noise glitches of Vout also are shown in FIG. 3.

Thus, flying capacitors C1 and C2 of charge pump 30 are swapped only when it is necessary to maintain accurate charge pump operation by ensuring that current source 7 does not saturate, thereby essentially minimizing the flying capacitor swapping frequency and thereby decreasing the overall power consumption of charge pump 30 of FIG. 2.

If initially the voltage $V_{LDO}$ on conductor 2 is close to the positive rail, then the circuit of A2 will not start. To avoid this problem, the clock input of flip-flop 22 may be coupled to suitable circuitry which forces it to change state after the elapsing of a certain amount of time which is significantly larger than the worst-case normal operating period of self-oscillating charge pump 30. For example, if self-oscillating circuit 10B of FIG. 2 gets "stuck" due to the voltage on conductor 2 being too close to $V_{DD}$, then flip-flop 22 can be forced to change state in various ways, whereupon it will continue to self-oscillate. For example, a low frequency oscillator (not shown) could be used to ensure that flip-flop 22 changes state after elapsing of a predetermined time interval, and an AND/OR gate or the like could be coupled between the output $V_{21}$ of comparator 20 and the clock input of flip-flop 22 so that if $V_{21}$ does not switch from a "0" level to a "1" level within the predetermined time interval, then the foregoing low-frequency oscillator causes flip-flop 22 to change state to thereby initiate self-sustaining self-oscillation of charge pump circuit 30.

The present invention provides increased circuit operating efficiency and reduced amounts of required chip area for integrated charge pump circuits.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. Of course, the boosted output voltage Vout produced by the integrated circuit 10B of FIG. 2 could be utilized for purposes other than controlling a tail current source. Constant voltage sources 5 and 28 can have suitable values other than those disclosed herein.

What is claimed is:

1. Charge pump circuitry comprising:
   (a) a current mode charge pump circuit including first and second flying capacitors and various associated switches operative in response to first and second phase signals which are of opposite phase, first and second controlled current sources, and a feedback amplifier all coupled so as to generate a boosted output voltage;
   (b) self-oscillating circuitry including
      (1) a comparison circuit having first and second inputs and an output,
      (2) a flip-flop circuit having a clock input coupled to the output of the comparison circuit and first and second outputs producing the first and second phase signals, respectively,
      (3) the current mode charge pump circuit producing a discharge signal representative of first and second bottom plate voltages alternately produced on the first and second flying capacitors, and
      (4) the comparison circuit output indicating times at which the first and second bottom plate voltages approach to within a predetermined voltage of a first supply voltage of the charge pump circuitry, the first input of the comparison circuit being coupled to receive the discharge signal.

2. The charge pump circuitry of claim 1 wherein the comparison circuit includes a comparator and a voltage source coupled between the second input of the comparison circuit and the first supply voltage.

3. The charge pump circuitry of claim 1 wherein the flip-flop circuit is configured to perform a divide-by-two function.

4. The charge pump circuitry of claim 1 wherein the boosted output voltage is applied to a utilization circuit on the same integrated circuit chip as the charge pump circuitry.

5. The charge pump circuitry of claim 4 wherein the utilization circuit includes an operational amplifier tail current source which needs to be biased by a boosted bias voltage greater than the first supply voltage.

6. The charge pump circuitry of claim 1 wherein the flip-flop circuit is an edge-triggered D-type flip-flop.

7. The charge pump circuitry of claim 6 wherein the D-type flip-flop is a master-slave flip-flop configured to perform a divide-by-two function.

8. The charge pump circuitry of claim 2 wherein the voltage source generates a voltage of approximately 150 mV.

9. The charge pump circuitry of claim 1 wherein the current mode charge pump includes a first voltage source coupled to a first input of the feedback amplifier, a second input of the feedback amplifier being coupled to the boosted output voltage, the current mode charge pump including first, second, third, fourth, fifth, sixth, seventh and eighth switches, a first controlled current source being coupled between the first supply voltage and a first conductor conducting the discharge signal, the output of the comparison circuit being coupled to control terminals of the first and second controlled current sources, the first switch being coupled between the first conductor and a second conductor coupled to a bottom plate of the first flying capacitor, the second switch being coupled between the second conductor and a reference voltage, the third switch being coupled between a third conductor and a fourth conductor, the third conductor being coupled to a top plate of the first flying capacitor, the second controlled current source being coupled between the first supply voltage and the fourth conductor, the fourth switch being coupled between the third conductor and the boosted output voltage, the fifth switch being coupled between the first conductor and a fifth conductor coupled to a bottom plate of the second flying capacitor, the sixth switch being coupled between the fifth conductor and the reference voltage, the seventh switch being coupled between the fourth conductor and a sixth conductor that is coupled to a top plate of the second flying capacitor, the eighth switch being coupled between the sixth conductor and the boosted output voltage.

10. The charge pump circuitry of claim 8 including a voltage source coupled between the first input of the feedback amplifier and the first supply voltage.

11. The charge pump circuitry of claim 2 wherein the voltage source generates a voltage of sufficient magnitude to prevent saturation of the first controlled current source.

12. The charge pump circuitry of claim 1 wherein the self-oscillating circuitry is powered by the first supply voltage and a LDO (low drop out) regulator.

13. The charge pump circuitry of claim 9 wherein control electrodes of the first, fourth, sixth and seventh switches are coupled to the first phase signal and wherein the control electrodes of the second, third, fifth and eighth are coupled to the second phase signal.

14. The charge pump circuitry of claim 1 wherein the flip-flop circuit is configured as a positive-edge-triggered flip-flop.

15. A method for operating charge pump circuitry to generate a boosted output signal, comprising:
(a) comparing a discharge signal produced in a current mode charge pump to a reference value by means of a comparison circuit producing an output signal having edges indicative, respectively, of times at which the discharge signal rises above the reference value and times at which the discharge signal falls below the reference value, the discharge signal being representative of first and second bottom plate voltages alternately produced on first and second flying capacitors of the current mode charge pump;
(b) applying the output signal of the comparison circuit to an input of a flip-flop;
(c) generating first and second complementary phase signals by means of the flip-flop; and
(d) applying the first and second phase signals to control electrodes of various switches that control operation of the first and second flying capacitors to generate the discharge signal.

16. The method of claim 15 including providing the reference value so as to approximately minimize the frequency of the first phase signal and also avoid saturation of a controlled current source of the current mode charge pump.

17. The method of claim 15 including applying the boosted output signal to bias an operational amplifier tail current source.

18. The method of claim 15 including providing a supply voltage and a reference voltage generated by a LDO (low drop out) voltage regulator to power the charge pump circuitry.

19. The method of claim 18 including applying the boosted output voltage to an inverting input of a feedback amplifier of the current mode charge pump and applying a boosted reference voltage that is equal to the sum of the supply voltage and a predetermined constant voltage to a non-inverting input of a feedback amplifier of the current mode charge pump.

20. Current mode charge pump circuitry, comprising:
(a) means for comparing a discharge signal produced in a current mode charge pump to a reference value by means of a comparison circuit producing an output signal indicative of times at which the discharge signal rises above the reference value and times at which the discharge signal falls below the reference value, the discharge signal being representative of first and second bottom plate voltages alternately produced on first and second flying capacitors of the current mode charge pump;
(b) means for generating first and second complementary phase signals in response to the output signal of the comparison circuit; and
(c) means for applying the first and second phase signals to control electrodes of various switches which control circuit connections of the first and second flying capacitors to generate the discharge signal to thereby determine a flying capacitor swapping frequency of the current mode charge pump.

* * * * *